(12) United States Patent
Keller et al.

(10) Patent No.: US 6,386,471 B1
(45) Date of Patent: May 14, 2002

(54) SYSTEM AND METHOD FOR AUTOMATING THE ASSEMBLY OF DATA STORAGE DEVICES

(75) Inventors: Joseph P. Keller; Gregg C. Hagen, both of Wahpeton, ND (US); Gregory D. Roberts, Breckenridge, MN (US); Gregory H. Johnson, Oakdale, MN (US); Michael W. Johnson, Cottage Grove, MN (US); Bryan W. Noble, Afton, MN (US)

(73) Assignee: Imation Corp., Oakdale, MN (US)

( * ) Notice: Subject to any disclaimer, the term of this patent is extended or adjusted under 35 U.S.C. 154(b) by 26 days.

(21) Appl. No.: 09/716,743

(22) Filed: Nov. 20, 2000

(51) Int. Cl.⁷ .................................. G11B 23/04
(52) U.S. Cl. .................. 242/347; 403/285; 220/653
(58) Field of Search .................. 242/347, 170, 242/348, 601; 403/36, 274, 276, 280, 282, 285; 220/652, 653

(56) References Cited

U.S. PATENT DOCUMENTS 4,371,286 A * 2/1983 Okamura et al. .......... 403/407
4,706,148 A * 11/1987 Komiyama et al. ........ 360/132
5,385,312 A * 1/1995 Kaneda et al. ............. 242/347
5,440,439 A * 8/1995 Rambosek et al. ........ 360/132
5,480,103 A   1/1996 Gerfast et al. ............. 242/347
5,577,681 A   11/1996 Sano et al. ................ 242/342
5,769,347 A * 6/1998 Kikuchi et al. ............ 242/347
5,779,172 A   7/1998 Anderson et al. .......... 242/336
5,797,556 A * 8/1998 Kikuchi .................... 242/340

* cited by examiner

Primary Examiner—Donald P. Walsh
Assistant Examiner—Mark J. Beauchaine
(74) Attorney, Agent, or Firm—Eric D. Levinson

(57) ABSTRACT

System for releasably retaining portions of a data cartridge shell in an assembled configuration including at least one first boss tower on a first portion of the data cartridge shell having a receiving hole with an inner surface. At least one second boss tower on a second portion of the data cartridge shell including an outer surface is adapted to releasably engage with the receiving hole at a boss tower interface in the assembled configuration. A plurality of retention ribs and a plurality of guide ribs are located at the boss tower interface to releasably retain the first portion of the cartridge shell to the second portion.

21 Claims, 4 Drawing Sheets

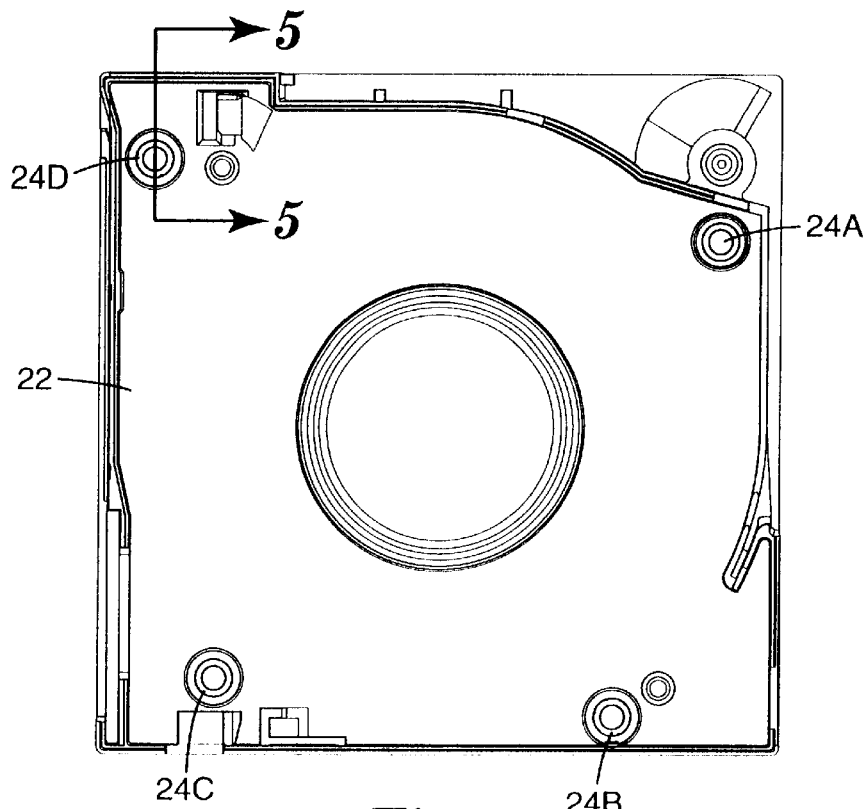
*Fig. 3*
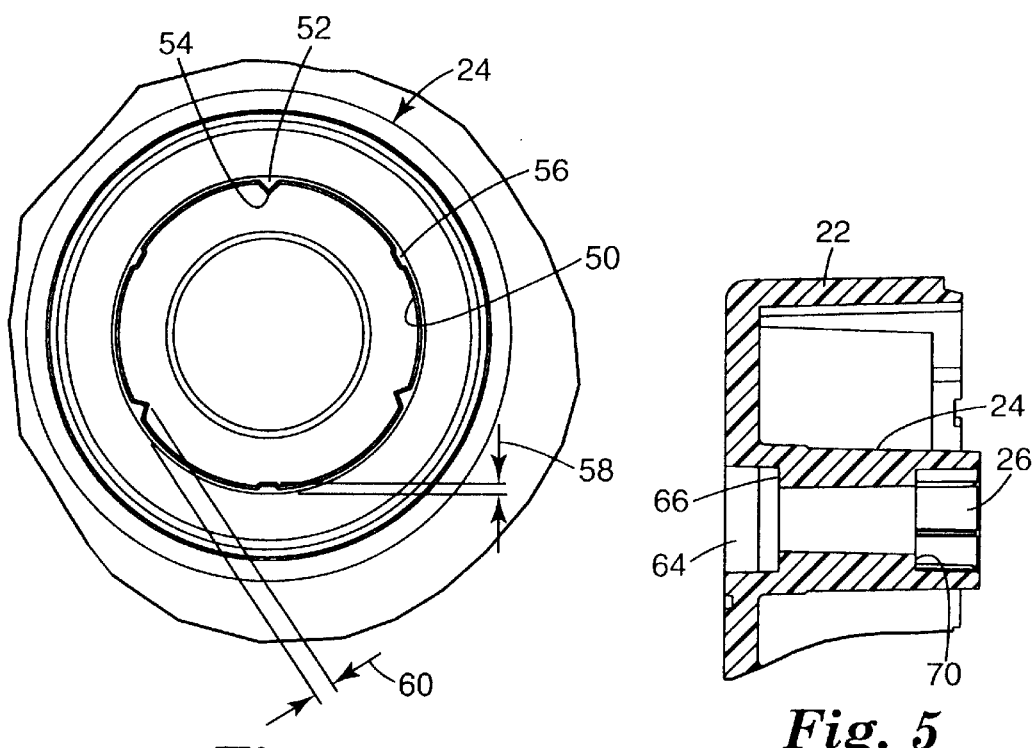
*Fig. 4*  *Fig. 5*

SYSTEM AND METHOD FOR AUTOMATING THE ASSEMBLY OF DATA STORAGE DEVICES

FIELD OF THE INVENTION

The present invention is directed to a system and method for automating the assembly of data storage devices, and in particular, to a system and method for releasably retaining portions of a data cartridge shell in an assembled configuration.

BACKGROUND OF THE INVENTION

Data storage devices, such as tape cartridges, tape cassettes and magnetic disks have been used for decades in the computer, audio and visual fields. The cartridges themselves have come in a large variety of sizes and types. The magnetic media is typically retained in a cartridge shell that comprises two or more pieces. For disks devices, a circular piece of magnetic or optical storage media is contained in the cartridge shell. For tape cartridges, one or more tape reels typically containing magnetic media, guide rollers, doors, and various other components are assembled in the cartridge shell. The pieces of cartridge shell typically need to be clamped together while screws are applied to secure the assembly. The external clamping device often interferes with automated assembly equipment. Consequently, many types of data cartridges are assembled manually.

What is needed is a system and method for automating the assembly of data cartridges.

SUMMARY OF THE INVENTION

The present invention is directed to a system and method for releasably retaining portions of a data cartridge shell in an assembled configuration. The retaining mechanism permits the portions of the data cartridge shell to be disassembled where rework is necessary. As used herein, "data storage device" or "data cartridge" refer to any device containing magnetic or optical media, such as a tape cartridge or rotating disk device.

The system for releasably retaining portions of a data cartridge shell in an assembled configuration comprises at least one first boss tower on a first portion of the data cartridge shell having a receiving hole with an inner surface. At least one second boss tower on a second portion of the data cartridge shell comprising an outer surface is adapted to releasably engage with the receiving hole at a boss tower interface in the assembled configuration. A plurality of retention ribs and a plurality of guide ribs are located at the boss tower interface to releasably retain the first portion of the cartridge shell to the second portion. The retention ribs and guide ribs can be located on the inner surface of the first boss tower, the outer surface of the second boss tower, or both.

In one embodiment, the retention ribs comprise a generally triangular cross-sectional shape. The retention ribs are partially deformed in the assembled configuration. The retention ribs typically comprise a height greater than a height of the guide rib. The guide ribs preferably comprise a substantially flat surface adapted to engage with the second boss tower. The guide ribs can have a generally rectangular cross-sectional shape. The guide ribs retain the inner surface in concentric alignment with the outer surface in the assembled configuration.

In one embodiment, the first boss tower comprises a generally cylindrical shape. The receiving hole preferably includes a shoulder adapted to engage with a distal end of the second boss tower in the assembled configuration. The receiving hole can also serve as a screw-receiving hole. The second boss tower typically has a corresponding screw receiving hole. The first and second boss towers can also be screw posts, reel lock posts, or a variety of other features of the data cartridge.

The present invention is also directed to a system for releasably retaining a data cartridge in an assembled configuration and to a data cartridge incorporating the retention system of the present invention.

The present invention is also directed to a method for releasably retaining portions of a data cartridge shell in an assembled configuration. The method includes the steps of providing at least one first boss tower on a first portion of the data cartridge shell comprising a receiving hole with an inner surface; providing at least one second boss tower on a second portion of the data cartridge shell comprising an outer surface; locating a plurality of retention ribs and a plurality of guide ribs on at least one of the inner surface of the receiving hole or the outer surface of the second boss tower; and releasably engaging the second boss tower with the receiving hole at a boss tower interface in the assembled configuration.

BRIEF DESCRIPTION OF THE SEVERAL VIEWS OF THE DRAWINGS

FIG. 3 is a top view of a first portion of a data cartridge shell in accordance with the present invention.

FIG. 4 is a top view of a first boss tower illustrated in FIG. 3.

FIG. 5 is a cross sectional view of the first boss tower of FIG. 3.

BRIEF DESCRIPTION OF THE INVENTION

Figure 1:
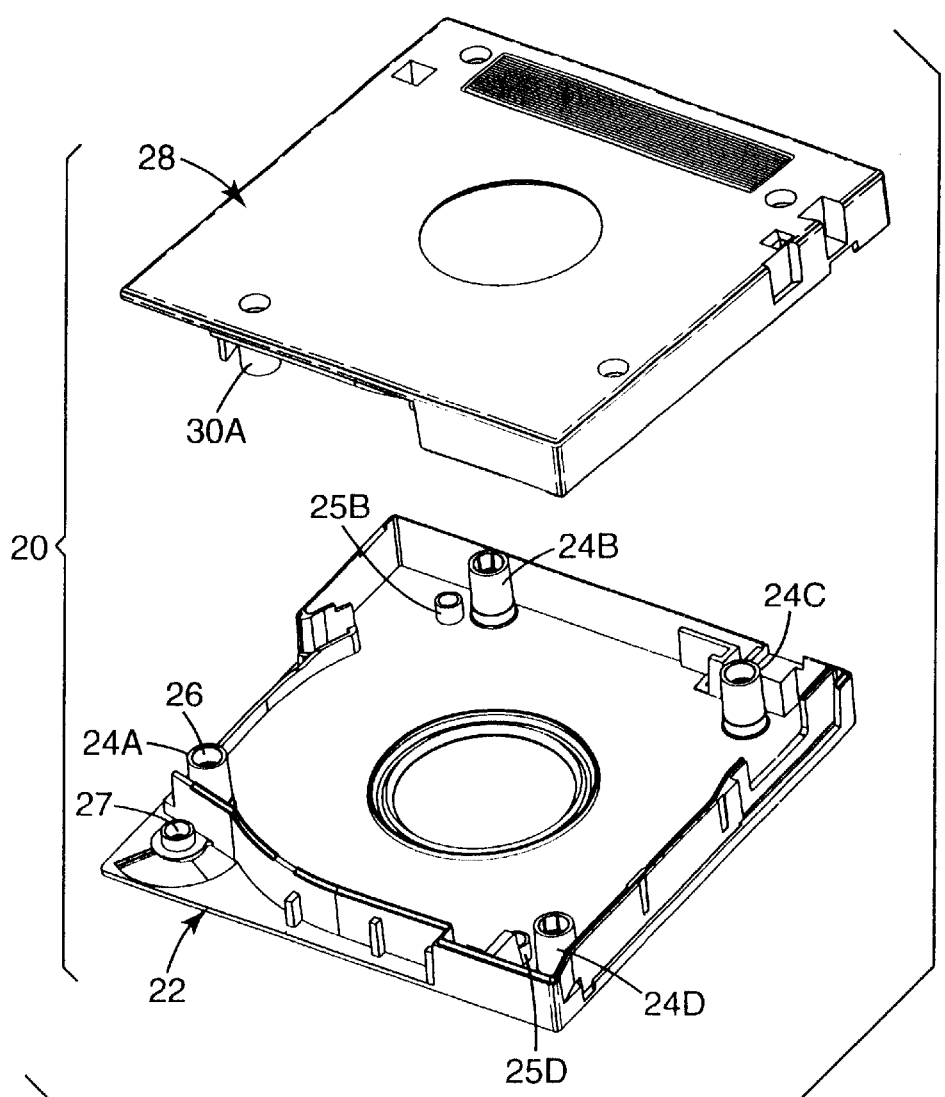
FIG. 1 is a schematic illustration of a data cartridge shell in a disassembled configuration in accordance with the present invention.

FIG. 1 is a perspective view of a cartridge shell 20 in accordance with the present invention. First portion 22 of the cartridge shell 20 includes a plurality of first boss towers 24A, 24B, 24C, 24D (referred to collectively as 24). In the illustrated embodiment, each of the first boss towers 24 includes a receiving hole 26 (see also FIG. 4). Second portion 28 includes a plurality of corresponding second boss towers 30A, 30B, 30C, 30D (referred to collectively as 30)(see FIG. 6). In the assembled configuration illustrated in FIG. 2, the first boss towers 24A–24D are aligned and engaged with the second boss towers 30A–30D, respectively, to form a retention system, as will be discussed in detail below.

Although FIG. 1 generally illustrates the first boss towers 24–24D arranged around the four corners of the first portion 22, a variety of configurations are possible. The number and location of the first boss towers 24 can vary with the type of data cartridge. Additionally, the first boss towers 24 may serve other functions in the data cartridge, such as reel lock posts, screw posts, structural supports, tape guide mounting posts, wrap pins, corner rollers and a variety of other features. For example, the function of reel lock posts 25B and 25D can be combined with first boss towers 24B and 24D. In another embodiment, the function of door pivot 27 can be combined with the boss tower 24A.

Figure 2:
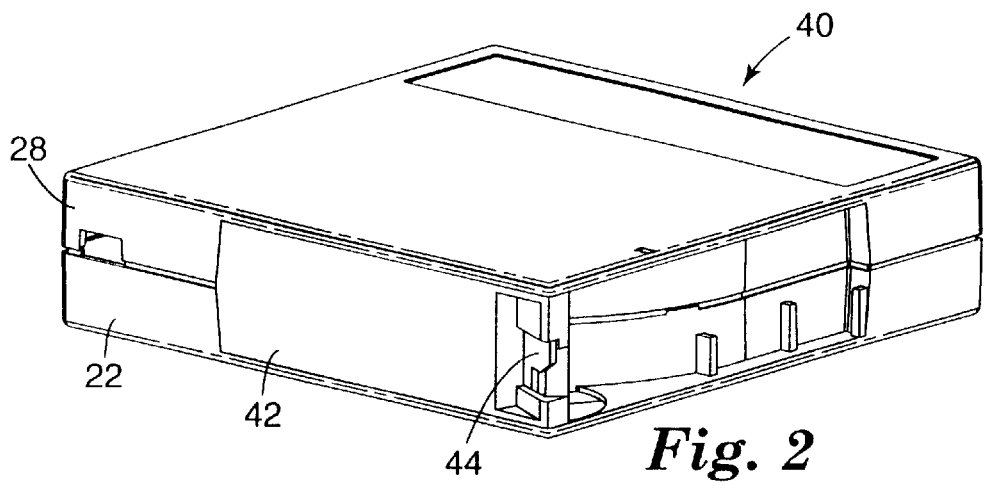
FIG. 2 is a schematic illustration of an assembled data cartridge in accordance with the present invention.

FIG. 2 is a perspective view of the first and second portions 22, 28 in an assembled configuration forming data cartridge 40. The data cartridge 40 typically includes various other features such as tape reels, tape guides, and magnetic tape. In the illustrated embodiment, the data cartridge includes door 42 and latch mechanism 44 for the door. Although FIG. 2 illustrates a digital lineal tape cartridge of the type sold under the trade mark (DLT Tape), the present system and method can be used with any of a variety of data cartridges, such as those shown in U.S. Pat. Nos. 5,480,103 (Gerfast et al.); 5,779,172 (Anderson et al.); and 5,577,681 (Sano et al.). For example, the first and second boss towers of the present invention can be incorporated into any of the drive roller, corner rollers, wrap pins and/or tape guides in the belt driven data cartridge disclosed in U.S. Pat. No. 5,577,681 (Sano et al.).

FIGS. 3 through 5 illustrate the first portion 22 of the cartridge shell 20 in greater detail. As best illustrated in FIGS. 4 and 5, the first boss towers 24 includes a receiving hole 26 formed therein. The receiving hole 26 includes an inner surface 50 having a plurality of retention ribs 52. Each of the retention ribs 52 includes a sacrificial portion 54, such as a tip or ridge that deforms in the assembled configuration (see FIGS. 9 and 10). As used herein, "sacrificial portion" refers to a distal portions of a retention rib that are deformed when engaged with a mating boss tower and "retention rib" refers to a structure comprising a sacrificial portion located at the boss tower interface. The retention ribs 52 can have a variety of cross-sectional shapes, such as triangular or curvilinear. Although the retention ribs 52 are illustrated as extending linearly along the length of the receiving hole 26, the retention ribs 52 can also be arranged in a variety of non-linear configurations, such as a spiral configuration.

The inner surface 50 also includes a plurality of guide ribs 56. The guide ribs 56 typically do not deform in the assembled configuration. Rather, the guide ribs 56 maintain alignment of the first portion 22 relative to the second portion 28. The guide ribs 56 can have a variety of cross-sectional shapes, such as square, rectangular or curvilinear. Although the guide ribs 56 are illustrated as extending linearly along the length of the receiving hole 26, the guide ribs 56 can also be arranged in a variety of non-linear configurations, such as a spiral configuration. As used herein, "guide rib" refers to a structure that exhibits minimal or no deformation while maintaining the alignment of the first and second boss towers at the boss tower interface. The guide ribs 56 typically have a height 58 less than the height 60 of the retention ribs 52. The portion of the retention ribs 52 extending above the height of the guide ribs 56 is typically the sacrificial portion 54.

The first and second boss towers 24, 30 are typically constructed from a polymeric material. The retention ribs 52 and the guide ribs 56 may be molded or machined onto the boss towers 24, 30. In an alternate embodiment, the retention ribs 52 and/or the guide ribs 56 are bonded to the boss towers 24, 30 by solvent bonding or an adhesive. The number and location of the retention ribs 52 and the guide ribs 56 will vary with the application and the design of the data cartridge. In the illustrated embodiment, the retention ribs 52 and guide ribs 56 are arranged in an alternating pattern on about sixty degree intervals. For the illustrated circular boss towers 24, 30, the minimum number of guide ribs 56 is preferably three so as to maintain concentric alignment at the boss tower interface (see FIGS. 8 and 9). In embodiments where the boss towers 24, 30 do not have a circular cross-section, the number of guide ribs 56 will vary depending upon the geometry.

The retention ribs 54 and the guide ribs 56 can also be formed on the outer surface 68 second boss tower 30, depending upon manufacturing constraints. In another embodiment, the retention ribs 54 are formed on one of the first and second boss towers 24, 30 and the guide ribs 56 are formed on the other of the first and second boss towers 24, 30.

As best illustrated in FIG. 5, the first boss towers 24 include a screw hole 64 having a shoulder 66 for engaging with the head of a screw (not shown) during assembly. The receiving hole 26 also includes a shoulder 70 that engages with distal end 72 of the second boss tower 30 (see FIG. 7).

Figure 6:
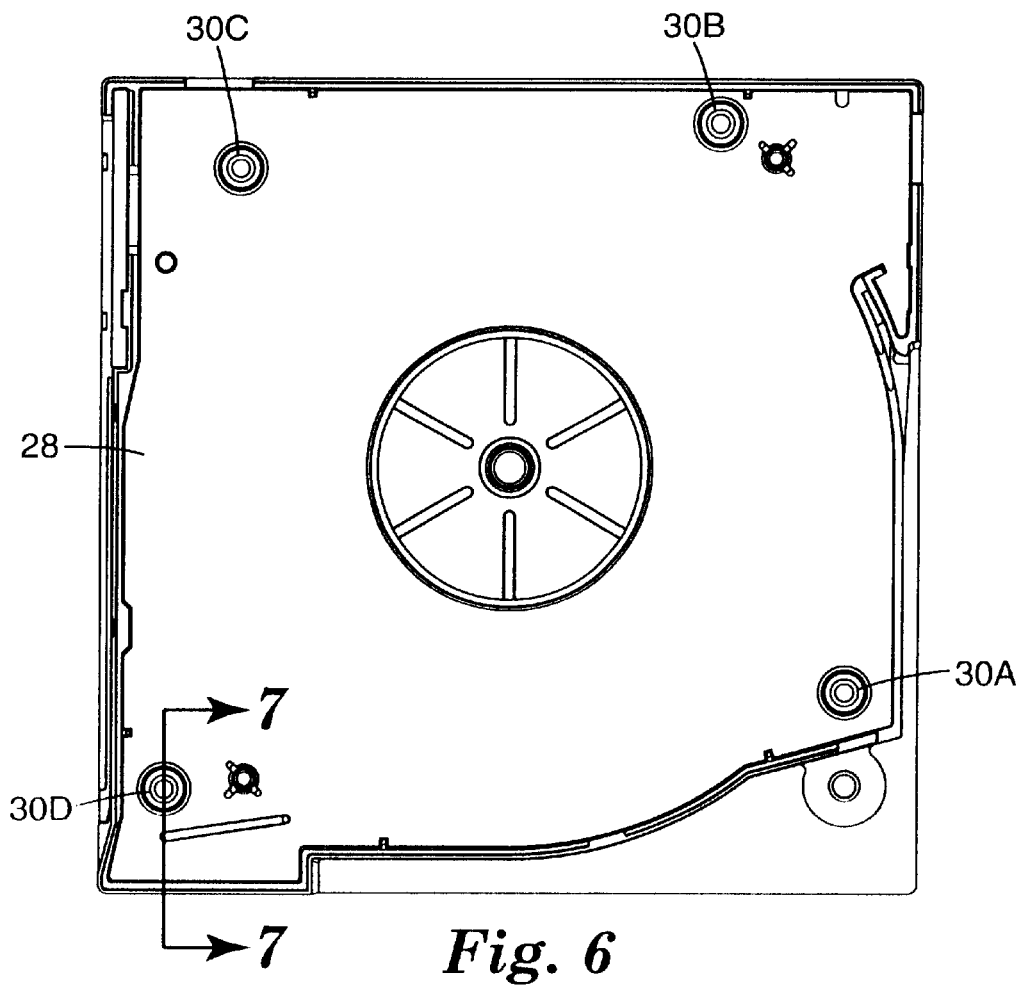
FIG. 6 is a top view of a second portion of a data cartridge shell in accordance with the present invention.
Figure 7:
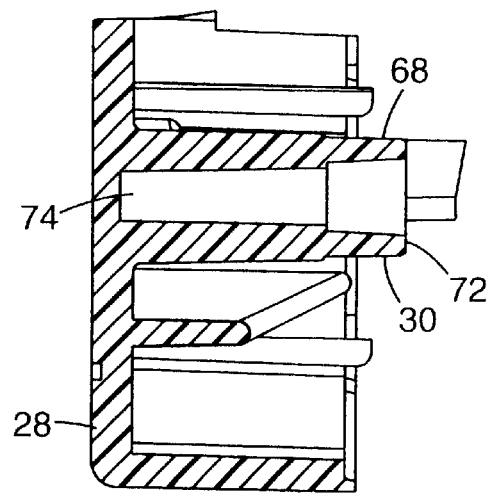
FIG. 7 is a cross sectional view of the second boss tower of FIG. 6.

FIGS. 6 and 7 illustrate the second portion 28 of the cartridge shell 20. As best illustrated in FIG. 7, the second boss towers 30 include an outer surface 68 adapted to engage with the receiving hole 26 on the first boss tower 24. Distal end 72 is adapted to engage with the shoulder 70 on the first boss tower 24. The second boss tower 30 typically includes a screw receiving hole 74 concentrically aligned with the screw hole 64 on the first boss tower 24 when the shell 20 is in the assembled configuration (see FIG. 9).

The retention ribs 52 and guide ribs 56 are preferably designed to maintain accurate alignment of the first portion 22 with the second portion 28 of the cartridge shell 20. The sacrificial tip 54 of the retention ribs 52 allows for greater interference with the second boss towers 30, while minimizing the force required to engage the two portions 22, 28 of the cartridge shell 20. Similarly, the sacrificial tip 54 minimizes the amount of force required to disassemble the cartridge shell 20 if rework is required. The sacrificial tip 54 easily deforms to the optimal size for the entire tolerance range of the first and second boss towers 24, 30.

It is possible that the retention ribs 52 may deform unevenly so that the portions 22, 28 of the cartridge shell 20 may be mis-aligned. Since such misalignment is unacceptable for many data cartridge applications, the guide ribs 56 are preferably designed without sharp corners and with a wide enough contact area 62 so that they do not deform under standard assembly and operating conditions. The contact area 62 can be flat or curvilinear to correspond to the shape of the outer surface 68 of the boss tower 28. The guide ribs 56 are preferably sized to match the outer surface 68 of the second boss tower 30 with minimal clearance giving optimal conditions for consistent alignment of the portions 22, 28 of the cartridge shell 20.

Figure 8:
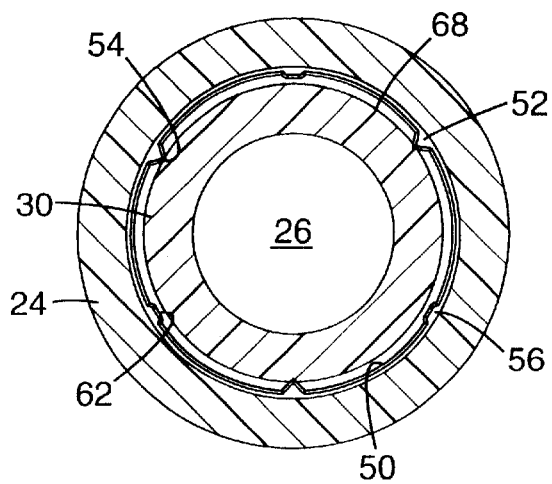
FIG. 8 is a top sectional view of a boss tower interface showing engagement of the first and second boss towers of FIG. 1.
Figure 9:
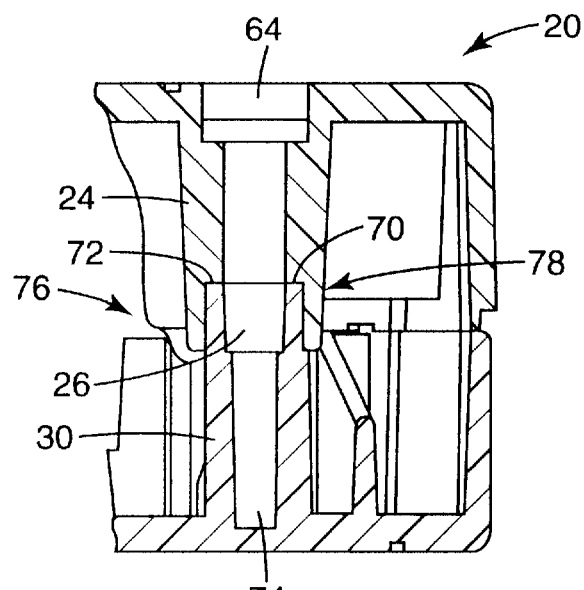
FIG. 9 is a side sectional view of a boss tower interface showing engagement of the first and second boss towers of FIG. 1.

FIGS. 8 and 9 are sectional views of a boss tower interface 76 for the retention system 78 in the assembled configuration. As used herein, "boss tower interface" refers to the overlapping and adjacent regions of the outer surface of one boss tower and the inner surface of the other boss tower when the first and second portions of the data cartridge shell are in the assembled configuration. Outer surface 68 of the second boss tower 30 engages with retention ribs 52 and the guide ribs 56 on the inner surface 50 of the first boss tower 24 in an interference or press fit configuration. Distal end 72 bottoms out in the receiving hole 26 against the shoulder 70. The press fit is adapted to provide sufficient retention force to hold the cartridge shell 20 in the assembled configuration during subsequent assembly steps without the need for external clamping mechanisms. The subsequent assembly step may include application of screws in the screw holes 64, 74. Alternatively, the present retention system can be used to secure the cartridge shell 20 while an adhesive cures. Consequently, a data cartridge using the cartridge shell in accordance with the present invention is well suited for automated assembly.

In the illustrated embodiment, the first and second boss towers 24, 30 serve as screw posts. Screw receiving hole 64 in the first boss tower 24 aligns generally concentrically with the screw receiving hole 74 in the second boss tower 30. The sacrificial portions 54 of the retention ribs 52 are deformed by engagement with the outer surface 68 of the second boss tower 30. The surfaces 62 on the guide ribs 56 serve to maintain the second boss tower 30 concentrically aligned with the receiving hole 26 in the first boss tower 24.

Figure 10:
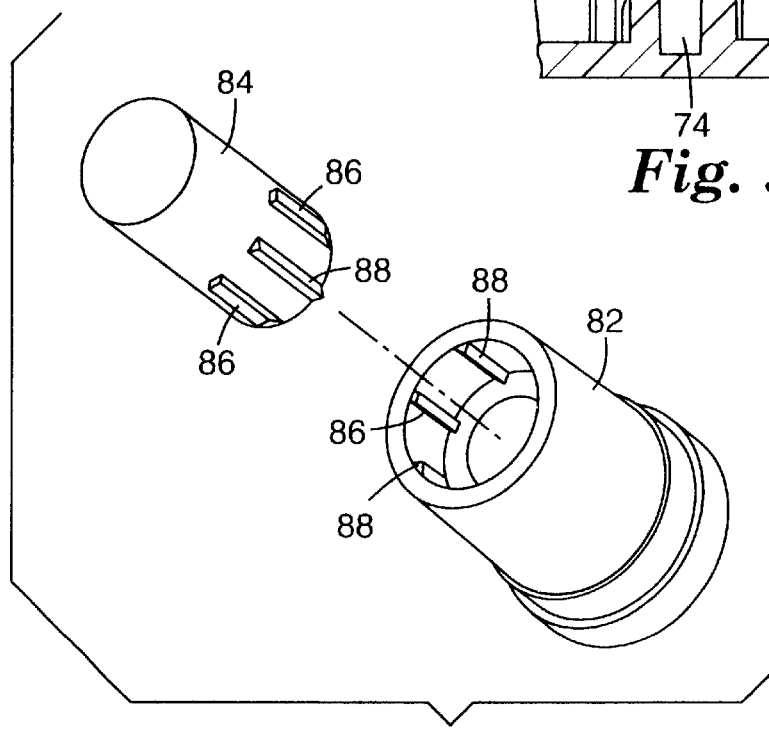
FIG. 10 is a perspective view of alternative first and second boss towers in accordance with the present invention.

FIG. 10 illustrates an alternate first boss tower 82 and second boss tower 84 in accordance with the present invention. In the illustrated embodiment, guide ribs 86 and/or retention ribs 88 may be formed on the first boss tower 82, the second boss tower 84, or both. In an alternate embodiment, guide ribs 86 are formed on one of the inner surface 92 of the first boss 82 towers while the retention ribs 88 are formed on the outer surface 94 of the second boss tower 84.

All of the patents and patent applications disclosed herein, including those set forth in the Background of the Invention, are hereby incorporated by reference. Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

What is claimed is:

1. A system for releasably retaining portions of a data cartridge shell in an assembled configuration comprising:

at least one first boss tower on a first portion of the data cartridge shell comprising a receiving hole with an inner surface;

at least one second boss tower on a second portion of the data cartridge shell comprising an outer surface adapted to releasably engage with the receiving hole at a boss tower interface in the assembled configuration; and a plurality of retention ribs and a plurality of guide ribs located at the boss tower interface when the first and second portions of the data cartridge shell are in the assembled configuration.

2. The system of claim 1 wherein the retention ribs are located on the inner surface of the first boss tower.

3. The system of claim 1 wherein the retention ribs are located on the outer surface of the second boss tower.

4. The system of claim 1 wherein the guide ribs are located on the inner surface of the first boss tower.

5. The system of claim 1 wherein the guide ribs are located on the outer surface of the second boss tower.

6. The system of claim 1 wherein the retention ribs comprise a sharp edges.

7. The system of claim 1 wherein the retention ribs comprise a generally triangular cross-sectional shape.

8. The system of claim 1 wherein the retention ribs are partially deformed in the assembled configuration.

9. The system of claim 1 wherein the retention ribs comprise a height greater than a height of the guide rib.

10. The system of claim 1 wherein the guide ribs comprise a substantially flat surface adapted to engage with the second boss tower.

11. The system of claim 1 wherein the guide ribs comprise a generally rectangular cross-sectional shape.

12. The system of claim 1 wherein the guide ribs retain the inner surface in concentric alignment with the outer surface in the assembled configuration.

13. The system of claim 1 wherein the first boss tower comprises a generally cylindrical shape.

14. The system of claim 1 wherein the receiving hole comprises a shoulder adapted to engage with a distal end of the second boss tower in the assembled configuration.

15. The system of claim 1 wherein the receiving hole comprises a screw receiving hole.

16. The system of claim 1 wherein the second boss tower comprises a screw receiving hole.

17. The system of claim 1 wherein the first and second boss towers comprise screw posts.

18. The system of claim 1 wherein the first and second boss towers comprise reel lock posts.

19. A system for releasably retaining a data cartridge in an assembled configuration comprising:

at least one first boss tower on a first portion of a data cartridge shell comprising a receiving hole with an inner surface;

at least one second boss tower on a second portion of a data cartridge shell comprising an outer surface adapted to releasably engage with the receiving hole at a boss tower interface in the assembled configuration; and a plurality of retention ribs and a plurality of guide ribs located at the boss tower interface when the first and second portions of the data cartridge shell are in the assembled configuration.

20. A tape cartridge comprising:

at least one first boss tower on a first portion of a data cartridge shell comprising a receiving hole with an inner surface;

at least one second boss tower on a second portion of a data cartridge shell comprising an outer surface adapted to releasably engage with the receiving hole at a boss tower interface in the assembled configuration;

a plurality of retention ribs and a plurality of guide ribs located at the boss tower interface when the first and second portions of the data cartridge shell are in an assembled configuration; and magnetic tape retained by the first and second portion of the data cartridge shell.

21. A method for releasably retaining portions of a data cartridge shell in an assembled configuration comprising the steps of:

providing at least one first boss tower on a first portion of the data cartridge shell comprising a receiving hole with an inner surface;

providing at least one second boss tower on a second portion of the data cartridge shell comprising an outer surface;

locating a plurality of retention ribs and a plurality of guide ribs on at least one of the inner surface of the receiving hole or the outer surface of the second boss tower; and releasably engaging the second boss tower with the receiving hole at a boss tower interface in the assembled configuration.

* * * * *